United States Patent
Nagata

[11] Patent Number: 5,260,739
[45] Date of Patent: Nov. 9, 1993

[54] CAMERA
[75] Inventor: Toru Nagata, Tokyo, Japan
[73] Assignee: Canon Kabushiki Kaisha, Tokyo, Japan
[21] Appl. No.: 754,670
[22] Filed: Sep. 4, 1991
[30] Foreign Application Priority Data
  Sep. 4, 1990 [JP] Japan ................. 2-232520
[51] Int. Cl.5 ............... G03B 17/24; H04N 9/64
[52] U.S. Cl. .................... 354/430; 354/482; 354/106; 358/29
[58] Field of Search .......... 354/430, 482, 105, 106; 358/29, 29 C

[56] References Cited
U.S. PATENT DOCUMENTS

| | | | |
|---|---|---|---|
| 3,736,856 | 6/1973 | Grossman et al. | 354/430 |
| 4,511,229 | 4/1985 | Schwartz et al. | 354/430 X |
| 4,626,893 | 12/1986 | Yamanaka | 358/29 |
| 4,887,121 | 12/1989 | Pritchard | 354/430 |
| 4,914,738 | 4/1990 | Oda et al. | 354/430 X |
| 5,016,094 | 5/1991 | Kaneko | 358/29 X |
| 5,053,871 | 10/1991 | Ogawa et al. | 354/430 X |
| 5,087,936 | 2/1992 | Ogata et al. | 354/430 |

Primary Examiner—W. B. Perkey
Attorney, Agent, or Firm—Fitzpatrick, Cella, Harper & Scinto

[57] ABSTRACT

This invention relates to a camera in which the color of a photographing light source is colorimetered to thereby obtain colorimetry information. This invention provides a camera of the above-described type in which provision is made for a sensor for measuring the colors of the photographing light source in different directions from the camera and the direction to be measured by the sensor is detected and is designated on the basis of the object distance and the color of the light source in the designated direction.

20 Claims, 5 Drawing Sheets

CAMERA

BACKGROUND OF THE INVENTION

1. Field of the Invention

This invention relates to a light source detecting apparatus in a camera provided with colorimetry means having a plurality of different light receiving ranges.

2. Related Background Art

It is common in video cameras (still and movie cameras) to have a colorimetry sensor for the purpose of keeping white balance, and also in silver chloride cameras, as described in Japanese Patent Publication No. 58-53327, there is disclosed a technique in which light source detection is effected and the information is recorded on film, thereby achieving automatization or simplification of examination of negatives at the stage of printing.

In the above-described example of the prior art, it is supposed that the color of the light source singular, and that the input to the colorimetry sensor is singular or that an image pickup element itself is used. On the other hand, under a condition in which different kinds of light sources are simultaneously present, for example, where a room is illuminated by fluorescent lamps but has a window or windows through which outdoor daylight comes into the room, the situation often occurs where the dominant light source in the angle of field of the camera differs from the light source impinging on the main object. At such time, the conventional technique has suffered from the problem that the color reproduction of the main object becomes very unsatisfactory.

SUMMARY OF THE INVENTION

One aspect of the present invention is to provide a camera which is provided with a colorimetry sensor having a plurality of light receiving angles and in which an object illuminating light source is detected by said sensor.

Another aspect of the present invention is to provide, a camera in which one of said plurality of light receiving angles is designated and an object illuminating light source is detected on the basis of the sensor output at the designated light receiving angle.

Still another aspect of the present invention is to provide a camera in which said one light receiving angle is designated in conformity with the object distance and an object illuminating light source is detected on the basis of the sensor output at said designated light receiving angle.

Still another aspect of the present invention is to provide a camera with recording means for recording light source information detected on, the basis of the sensor output.

Still another aspect of the application is to a camera in which the light source information detected on the basis of the sensor output is recorded on a recording medium provided on the film.

Other objects of the present invention will become apparent from the following detailed description of some embodiments of the invention taken in conjunction with the accompanying drawings.

DESCRIPTION OF THE PREFERRED EMBODIMENTS

Figure 1:
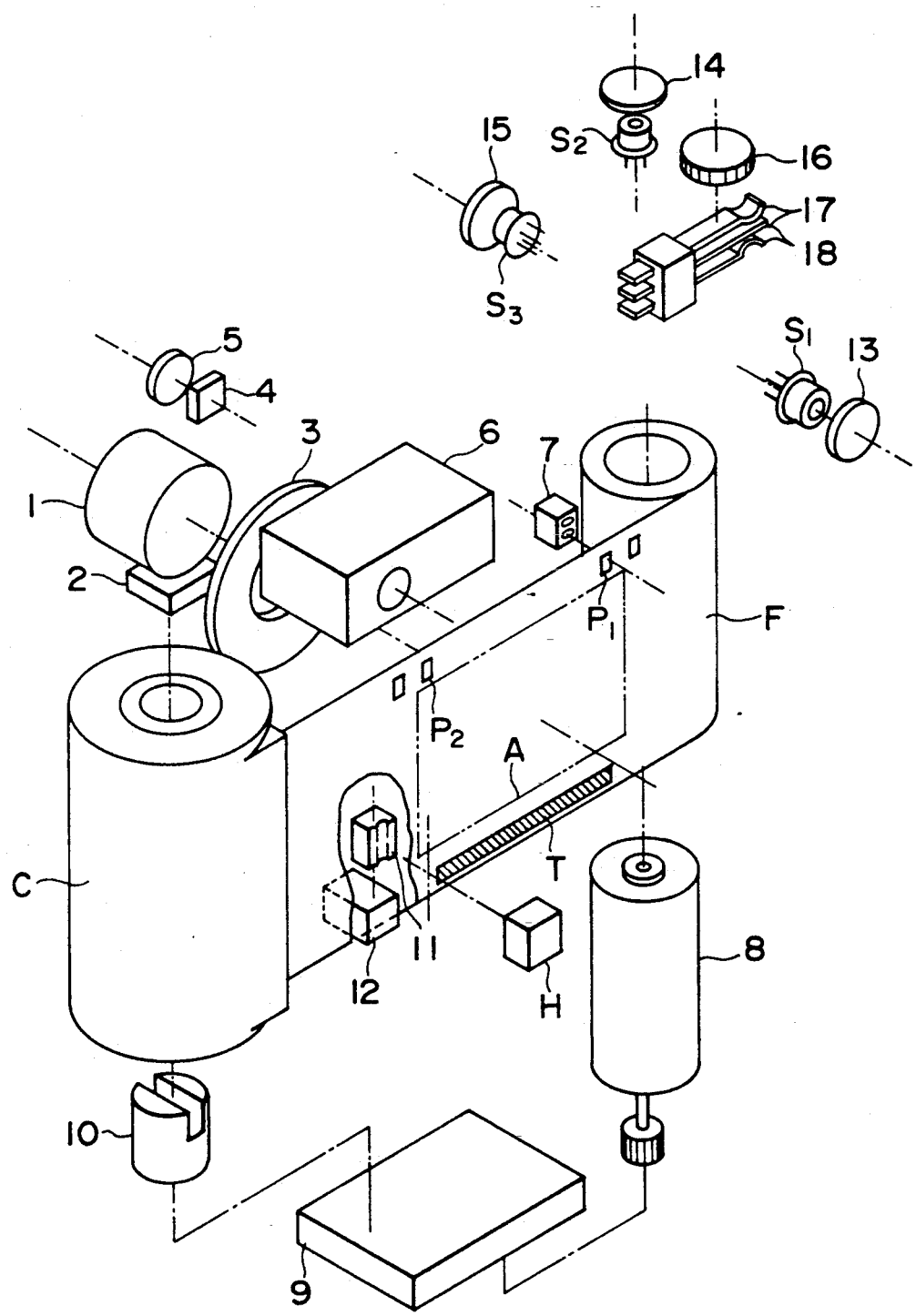
FIG. 1 is a perspective view showing the constructions of the essential portions of a camera including a first embodiment of the present invention.

FIG. 1 is a perspective view showing the constructions of the essential portions of a camera including a light source detecting apparatus which is a first embodiment of the present invention.

In FIG. 1, the reference numeral 1 designates a photo-taking lens, the reference numeral 2 denotes a lens actuator for driving the phototaking lens 1 and a lens encoder for producing a lens position signal, the reference numeral 3 designates a lens shutter, the reference numeral, 4 denotes a photometry sensor for automatic exposure (AE), the reference numeral 5 designates a lens for determining the light receiving angle of the photometry sensor 4, the reference numeral 6 denotes a block including a distance measuring sensor and a finder, the reference numeral 7 designates a photocoupler for detecting perforations such as $P_1$ and $P_2$ in film F and producing a signal for effecting the predetermined feeding of the film F, the reference numeral 8 denotes a film feeding motor disposed in a spool, the reference numeral 9 designates a gear train for effecting reduction of output speed of motor 8 and the changeover between winding and rewinding of the film, and the reference numeral 10 denotes a rewinding fork.

The letter C designates a film cartridge, the letter F denotes the aforementioned film provided with a magnetic memory portion (a magnetic track T), $P_1$ and $P_2$ designate the aforementioned perforations corresponding to the photographing image position A, and the letter H denotes a magnetic head for writing information on the magnetic track T on the film F or reading the information therefrom. The reference numeral 11 designates a pad for urging the film F against the magnetic head H. The pad 11 has in the central portion thereof a recess for enhancing the intimate contact between the film F and the head gap. The reference numeral 12 denotes a forward and backward movement control mechanism for urging the pad 11 against the magnetic head H with predetermined pressure only during film feeding, $S_1$, $S_2$, $S_3$, designate colorimetry sensors. The colorimetry sensor $S_1$ has its sensitivity rearwardly of the camera, the colorimetry sensor $S_2$ has its sensitivity above the camera, and the colorimetry sensor $S_3$ has its sensitivity forwardly of the camera. The reference numerals 13, 14, and 15 denote white diffusion plates corresponding to the colorimetry sensors $S_1$, $S_2$, and $S_3$ the reference numeral 16 designates a release button, the reference numeral 17 denotes a switch (SW1) for starting photometry and distance measurement, and the reference numeral 18 designates a switch (SW2) for starting the opening of a shutter and the sequence of film feeding.

Figure 2:
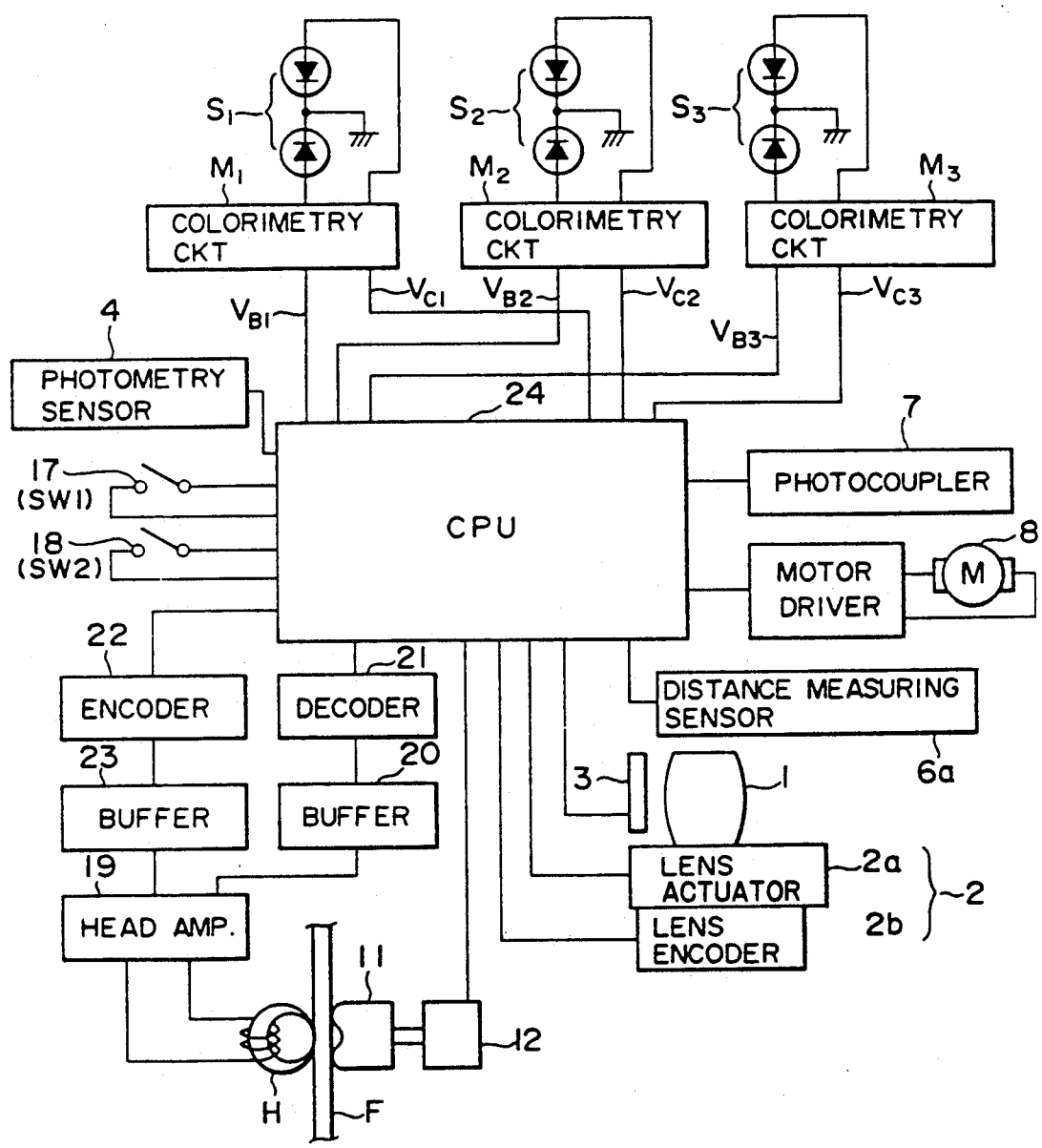
FIG. 2 is a block diagram of the camera of FIG. 1.

FIG. 2 is a block diagram of portions according to the present invention, and in FIG. 2, the same portions as those in FIG. 1 are given the same reference characters.

In FIG. 2, $M_1$, $M_2$, and $M_3$ designate colorimetry circuits to which the outputs of the colorimetry sensors $S_1$, $S_2$, and $S_3$ are input and which output brightness signals $V_{B1}$, $V_{B2}$, $V_{B3}$ and color signals $V_{C1}$, $V_{C2}$, $V_{C3}$. The reference numeral 19 denotes a head amplifier for the magnetic head H, the reference numeral 20 designates a buffer, the reference numeral 21 denotes a decoder, the reference numeral 22 designates an encoder, the reference numeral 23 denotes a buffer, and the reference numeral 24 designates a CPU for effecting the sequence control of each circuit.

The sequence of the operation of the camera will now be described.

When the film cartridge C is inserted into the camera, the CPU 24 drives the film feeding motor 8 through a motor driver to thereby wind up all of the film F. At this time, the information of the film speed, the prescribed number of frames and the film type recorded on the magnetic track T on the film F is read out by the magnetic head H, is amplified by the head amplifier 19 and is A/D-converted, whereafter the information is transferred to the buffer 20. When the predetermined information is transferred, the decoder 21 decodes the information and transfers it to the CPU 24. The CPU 24 counts the number of fed frames by the output of the photocoupler 7, and when said number reaches the prescribed number of frames previously read, the driving of the film feeding motor 8 is inhibited to thereby stop the winding of the film. Thereafter, when the switch SW1 is closed, the operations of distance measurement, photometry and colorimetry are performed and the information is transferred to the CPU 24 and processed there, and exposure is waited for.

The colorimetry signal processed by the CPU 24 is converted into light source information, whereafter this information is encoded by the encoder 22 and is accumulated in the buffer 23.

At that point, the switch SW2 is closed, the lens actuator 2a drives the photo-taking lens 1, that is, performs the focusing operation, until a stop signal comes thereto from the CPU 24 while outputting a lens position signal from the lens encoder 2b to the CPU 24. Thereafter, the opening-closing operation of the shutter 3 is performed for a time determined by the output of the photometry sensor 4, and then the winding of one frame of film is effected on the basis of the output from the photocoupler 7. At this time, the encoded light source information is sent from the buffer 23 to the magnetic head H via the head amplifier 19, and this light source information is written onto the magnetic track T on the film F. Thereafter, when the exposure of the prescribed number of frames is terminated, the rewinding operation is performed until all of the film F comes into the film cartridge C.

What has been described above is a series of sequence operations and the details thereof will be described later with reference to the flow chart of FIG. 5. The pad 11 is pressed against the magnetic head H by the pad forward and backward movement control mechanism 12 only during the movement of the film F so that the reading and writing of magnetic information is reliable.

An example of the colorimetry sensors $S_1$, $S_2$, and $S_3$ and colorimetry circuits $M_1$, $M_2$, and $M_3$ will now be described with reference to FIGS. 3 and 4.

Figure 3A:
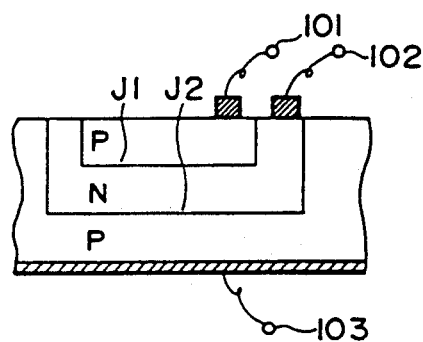
FIGS. 3A and 3B illustrate an example of the colorimetry sensor of FIG. 1.
Figure 3B:
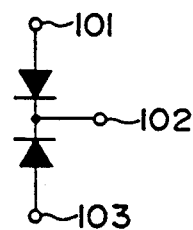

FIG. 3A shows the cross-section of the sensor in correspondence to the terminal of the circuit diagram (FIG. 3B).

Two PN junctions are layered on a silicon substrate and the distances thereof from the surface of the silicon substrate differ from each other and therefore, J1 has a sensitivity peak on a shorter wavelength and J2 has a sensitivity peak on a longer wavelength. As a result, the ratio between the short currents from the two varies in proportion to the wavelength of incident light. As shown in FIG. 4, in the actual circuit, logarithmic compression is effected by logarithmic compression circuits 104 and 105, whereafter the difference is taken by a substraction circuit 106, whereby there is obtained a color signal $V_{Ci}$. Also, this signal is re-expanded into an electric current by expander circuits 107 and 108, whereafter it is added by an adder circuit 109, whereby there is obtained a brightness signal $V_{Bi}$ via a current-voltage converting circuit 110.

Besides this, there is also put into practice a colorimetry Si comprising filters of three primary colors red(R), green(g), and blue(b) provided on SPC by the filter on-chip technique, and for example, "$\Sigma(V_R+V_G+V_B)$" or $V_G$ can be used as the brightness signal, and "$(\iota n V_R - \iota n V_B)$" can be used as the color signal.

A method of judging the color of the light source will hereinafter be described in detail with reference to the main flowchart of FIG. 5.

"Step 201"—Whether the switch SW1 is closed is judged, and by this switch being closed, advance is made to a step 202.

"Step 202"—The distance measuring sensor 6a (see FIG. 2) is driven to thereby perform the distance measuring operation, and object distance information is obtained.

"Step 203"—The object distance obtained at step 202 is compared with a predetermined distance D, and if the object distance is smaller than or equal to the predetermined distance D, advance is made to a step 204, and if the object distance is greater than the predetermined distance D, advance is made to a step 205.

"Step 204"—At this step, the object lies at a location nearer than the predetermined distance D and therefore, the color signal of the colorimetry sensor $S_1$ having its sensitivity rearwardly of the camera is read and this signal is used as a color signal Vc.

"Step 205"—At this step, the object lies at a location farther than the predetermined distance D and therefore, the color signal of the colorimetry sensor $S_3$ having its sensitivity forwardly of the camera is read and this signal is used as a color signal Vc.

The reason, at steps 204 and 205, "why when" the object lies at a location nearer than the predetermined distance D, the colorimetry sensor $S_1$ rearward of the camera is selected and why when the object lies at a location farther than the predetermined distance D, the colorimetry sensor $S_3$ forward of the camera is selected is that under a photographing situation in which the colors of the light sources forward and rearward of the camera differ due to different kinds of light sources, the nearer the camera is to the object, the more the object is affected by the illumination from rearward of the camera, and the farther the object is from the camera, the more the object is affected by the illumination from forward of the camera.

Also, it is desirable that said predetermined distance D, which is the reference when the colorimetry sensor Si is selected, be determined in accordance with the photographing magnification, and suitably it should be of the order of "$20f$" relative to the focal length f of the photo-taking lens 1.

"Step 206"—The light source color is judged on the basis of the color signal Vc (the details of this will be described later).

"Step 207"—The light source information is encoded into a form of information written onto the film F (by the encoder 22 as previously described), and is accumulated in the buffer 23.

"Step 208"—Whether the switch SW1 is closed is again judged, and if this switch remains closed, advance is made to a step 209, and if this switch is opened, return is made to the step 201.

"Step 209"—Whether the switch SW2 is closed is judged, and if this switch is closed, advance is made to a step 210, and if this switch is open, return is made to the step 208.

"Step 210"—At this step, the shutter 3 is opened to thereby start the exposing operation.

"Step 211"—Whether the exposure time determined by the output of the photometry sensor 4 has elapsed and the exposing operation has been finished is judged, and when this operation is finished, advance is made to a step 212.

"Step 212"—The film feeding motor 8 is driven to start the winding of the film.

"Step 213"—The pad forward and backward movement control mechanism 12 is driven to move the pad 11 into the film passage plane, thereby urging the magnetic track T of the film F against the magnetic head H.

"Step 214"—The light source color information accumulated in the buffer 23 is transferred to the head amplifier 19, and said light source color information is written into the magnetic track T by the magnetic head H.

"Step 215"—Whether a pulse number corresponding to one frame feeding has come from the photocoupler 7 is judged, and by this pulse number coming, one frame feeding is judged to have been completed and advance is made to a step 216.

"Step 216"—The pad forward and backward movement control mechanism 12 is driven to retract the pad 11 from the film passage plane.

"Step 217"—The driving of the film feeding motor 8 is inhibited to thereby stop the winding of the film. Thus, the series of operations are terminated.

While magnetic recording has been shown above as an example of the method of recording light source information on the film, it is also possible to adopt optical recording using an LED or the like, as known in the art.

Figure 6:
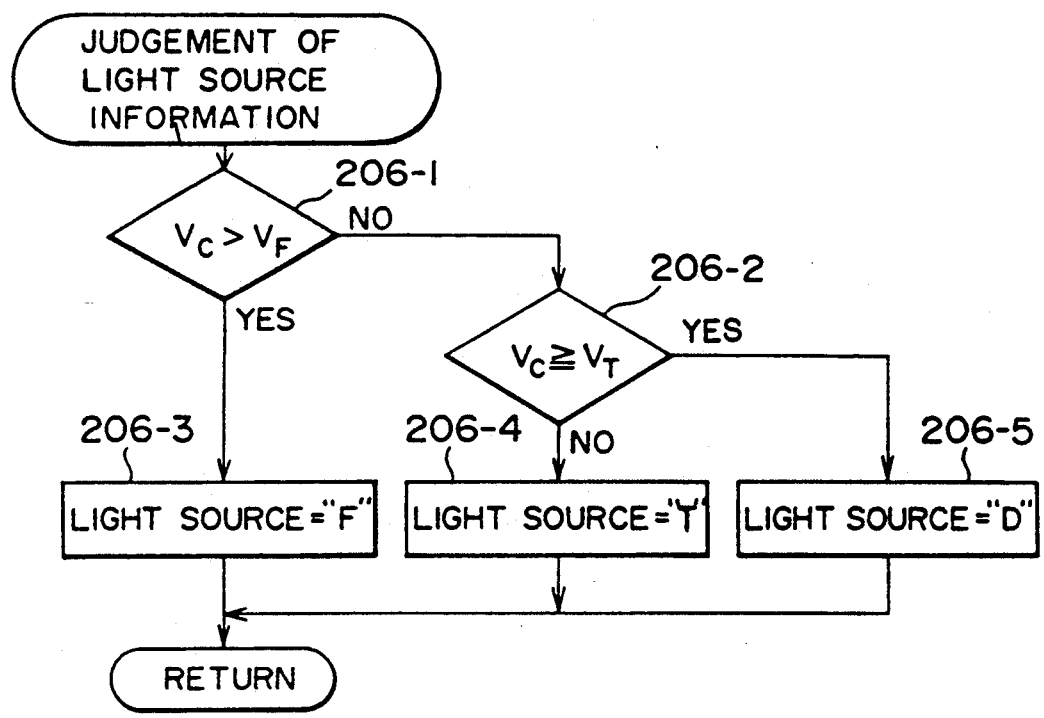
FIG. 6 is a flowchart showing the light source information judging operation performed at step 206 of FIG. 5.

The light source information judgement subroutine carried out at the step 206 will now be described with reference to the flowchart of FIG. 6.

Figure 4:
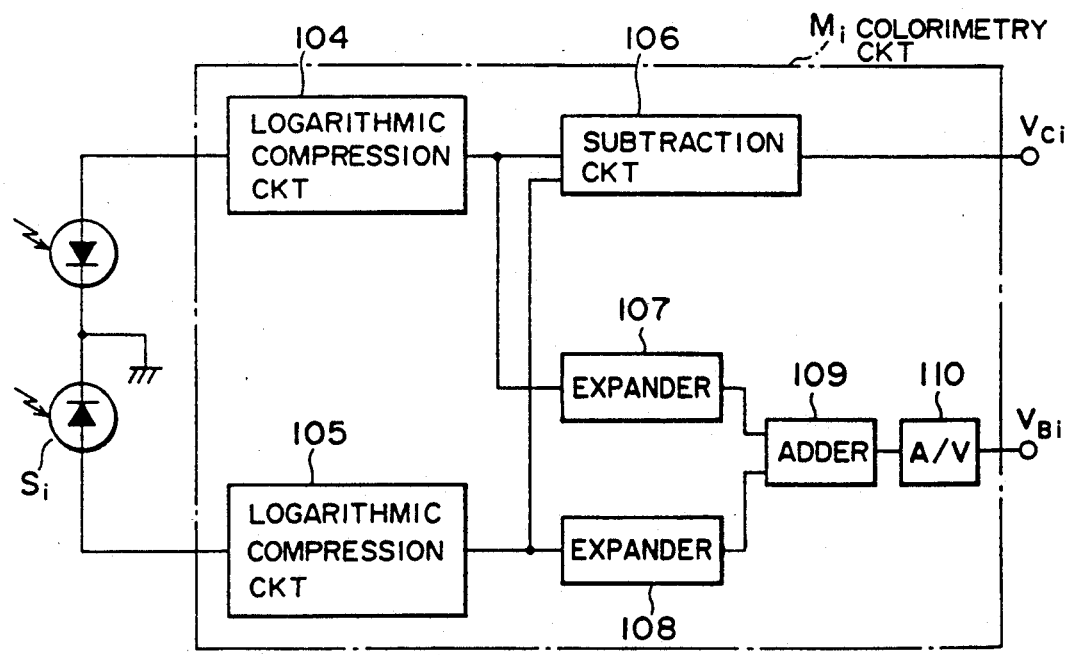
FIG. 4 is a block diagram showing an example of the construction of the colorimetry circuit of FIG. 1.

The color signal Vci which is the output of the colorimetry sensor Si described with reference to FIG. 4 is a voltage output proportional to the dominant one of the light source colors, and the voltage level thereof is in the relation that "tungsten light < daylight < fluorescent lamp", and is a permutation corresponding to "red < yellow < green". So, in this embodiment, the changeover voltage between tungsten "T" and daylight "D" is defined as $V_T$ and the changeover voltage between daylight and fluorescent lamp "F" is defined as $V_F$.

"Step 206-1" (dash) The color signal Vc determined at the steps 204 and 205 is compared with the changeover voltage $V_F$ and if they are in the relation that $Vc > V_F$, advance is made to a step 206-3, and if they are in the relation that $Vc \leq V_F$, advance is made to a step 206-2.

"Step 206-2" (dash) The color signal Vc is compared with the changeover voltage $V_T$ and if they are in the relation that $Vc < V_T$, advance is made to a step 206-4, and if they are in the relation that $Vc \geq V_T$, advance is made to a step 206-5.

"Step 206-3" (dash) Since at the step 206-1, it has been judged that Vc and $V_F$ are in the relation that $Vc > V_F$, at this step, the light source color is judged to be "F", and return is made to the main routine.

"Step 206-4" (dash) Since at the step 206-2, it has been judged that Vc and $V_T$ are in the relation that $Vc < V_T$, at this step, the light source color is judged to be "T", and return is made to the main routine.

"Step 206-5" (dash) Since at the step 206-2, it has been judged that Vc and $V_T$ are in the relation that $Vc \geq V_T$, at this step, the light source color is judged to be "D", and return is made to the main routine.

Figure 5:
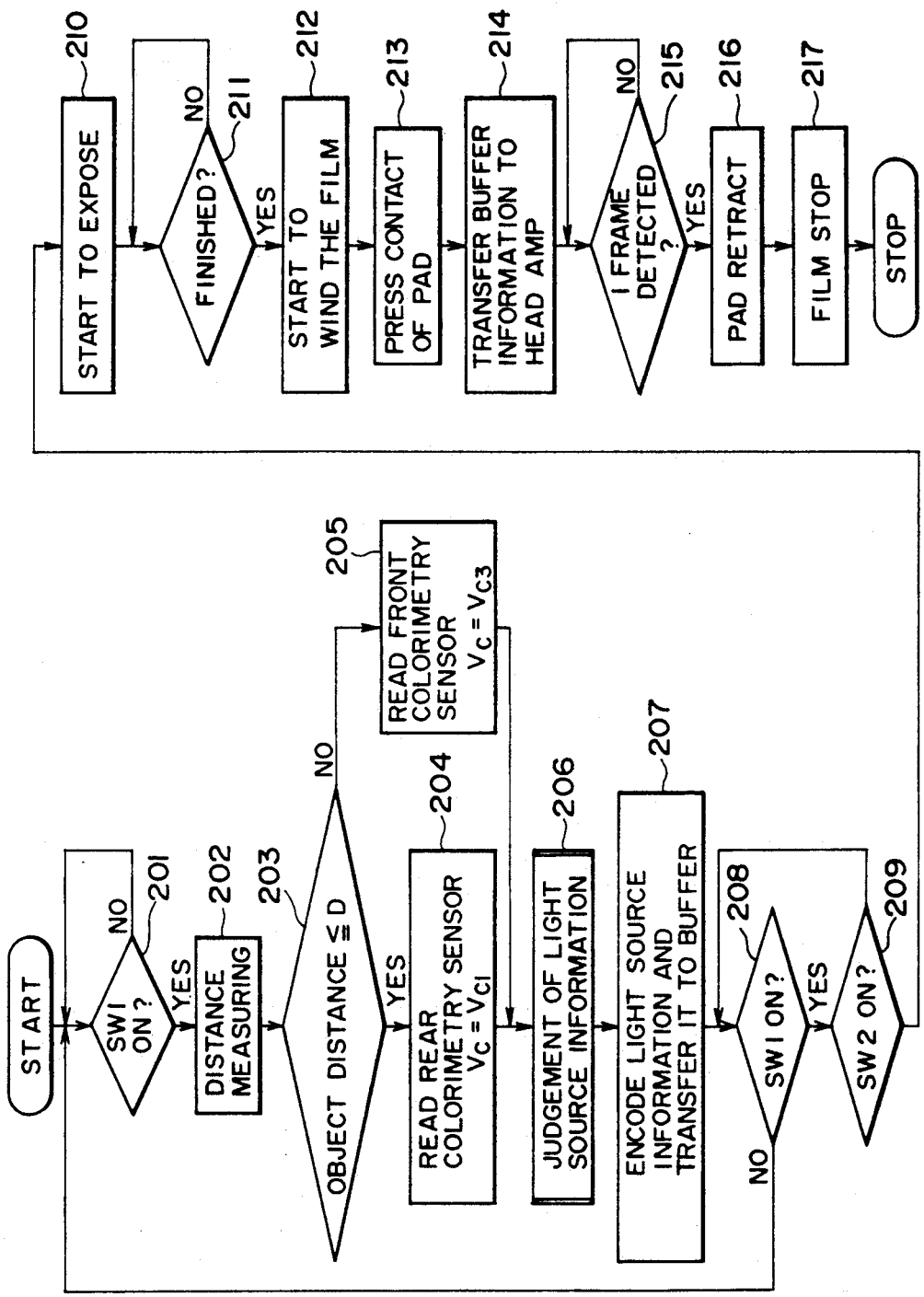
FIG. 5 is a flowchart showing the operation of a camera including the first embodiment of the present invention.

In this manner, the light source color information is judged and advance is made to the step 207 of FIG. 5.

Figure 7:
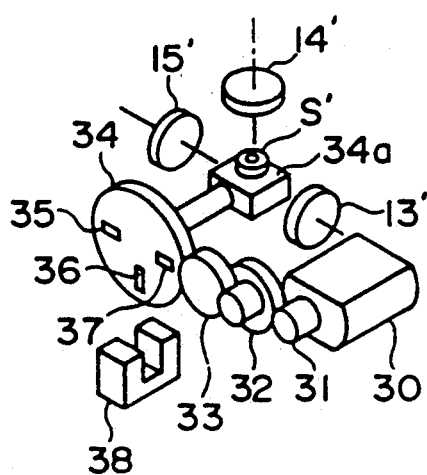
FIG. 7 is a perspective view showing the constructions of the essential portions of a second embodiment of the present invention.

FIG. 7 is a perspective view showing the essential portions of a second embodiment of the present invention. In FIG. 7, the letter S' designates a colorimetry sensor, the reference numerals 13', 14', and 15' denote white diffusion plates fixed to the camera body, the reference numeral 30 designates a motor for controlling the colorimetry sensor S', the reference numeral 31 denotes a pinion gear secured to the output shaft of the motor 30, the reference numerals 32 and 33 designate reduction gears, and the reference numeral 34 denotes an output gear to which the colorimetry sensor S' is secured and which has three slits 35, 36 and 37 corresponding to directions in which the colorimetry sensor S' is to face. The reference numeral 38 designates a photointerrupter for detecting the slits 35, 36 and 37 to thereby detect the positions of the output gear 34 and the colorimetry sensor S'.

The first embodiment has a plurality of colorimetry sensors $S_1$, $S_2$, and $S_3$, whereas this embodiment has a single colorimetry sensor S', and in this embodiment, the motor 30 is electrically energized to let the colorimetry sensor S' face in the direction determined at the step 203 of the flow chart of FIG. 5, and the motor 30 is stopped by the detection of the slit 35, 36 or 37 by the photointerrupter 38. The operations at the steps 204 and 205 are then realized.

Figure 8:
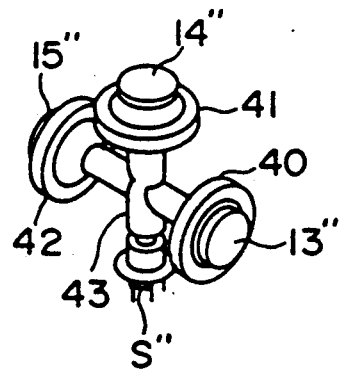
FIG. 8 is a perspective view showing the constructions of the essential portions of a third embodiment of the present invention.

FIG. 8 is a perspective view showing the essential portions of a third embodiment of the present invention. In FIG. 8, the letter S" designates a colorimetry sensor, the reference numerals 13", 14", and 15" denote white diffusion plates secured to the outer surface of the camera body, the reference numeral 43 designates a light guide for directing light passed through each diffusion plate to the sensor S", and the reference numerals 40, 41 and 42 denote shutters provided between the diffusion plates 13", 14", and 15" and the light guide 43. These shutters may be mechanical type shutters or liquid crystal shutters.

In this embodiment, only the shutter in the direction determined at the step 203 of the flow chart of FIG. 5 is opened to thereby realize the operations at the steps 204 and 205 thereafter.

According to each of the above-described embodiments, during photographing, first the most influential light source position is discriminated by the distance from the camera to the object, and then the light source color of this light source is judged and therefore, the illuminating light source color for the object can be judged more accurately. Consequently, it becomes possible to make the color reproduction of the object very satisfactory.

What is claimed is:

1. A camera including:
   a) a colorimetry sensor portion having a plurality of different light receiving angles;
   b) designating means for designating the light receiving angle of said sensor portion; and
   c) a processing circuit for obtaining colorimetry information on the basis of a sensor output conforming to light from the light receiving angle designated by said designating means.

2. A camera according to claim 1, wherein said designating means designates the light receiving angle of the sensor portion on the basis of the object distance.

3. A camera according to claim 1, wherein the light receiving angle of said colorimetry sensor portion includes at least a first light receiving angle covering the front of the camera and a second light receiving angle covering the rear of the camera.

4. A camera according to claim 3, wherein said designating means designates said second light receiving angle when the object distance is shorter than a predetermined distance.

5. A camera according to claim 3, wherein said designating means designates said first light receiving angle when the object distance is longer than a predetermined distance.

6. A camera according to claim 4, wherein said object distance is found from a detection output detected by the distance measuring circuit of the camera.

7. A camera according to claim 5, wherein said object distance is found from a detection output detected by the distance measuring circuit of the camera.

8. A camera according to claim 1, wherein said colorimetry sensor portion has a plurality of sensors having different light receiving angles, and said designating means selects said sensors to thereby designate a light receiving angle.

9. A camera according to claim 1, wherein said colorimetry sensor portion has a displacing member for displacing a colorimetry sensor into a different state, and has a different light receiving angle by the sensor being displaced by said displacing member, and said designating means designates a light receiving angle by the sensor being displaced into a predetermined state by said displacing member.

10. A camera according to claim 1, wherein said colorimetry sensor portion has transmission means for selectively directing lights from the different light receiving angles to a colorimetry sensor, and said designating means designates the light from a light receiving angle of the lights directed by said transmission means to thereby designate the light receiving angle.

11. A camera including:
   a) a colorimetry sensor portion having a plurality of different light receiving angles;
   b) designating means for designating the light receiving angle of said sensor portion;
   c) a processing circuit for obtaining colorimetry information on the basis of a sensor output conforming to light from the light receiving angle designated by said designating means; and
   d) recording means for recording on a recording medium photographing light information obtained by said processing circuit.

12. A camera according to claim 11, wherein the light receiving angle of said colorimetry sensor portion includes at least a first light receiving angle covering the front of the camera and a second light receiving angle covering the rear of the camera.

13. A camera according to claim 12, wherein said designating means designates said second light receiving angle when the object distance is shorter than a predetermined distance.

14. A camera according to claim 12, wherein said designating means designates said first light receiving angle when the object distance is longer than a predetermined distance.

15. A camera according to claim 13, wherein said object distance if found from a detection output detected by the distance measuring circuit of the camera.

16. A camera according to claim 13, wherein said recording means records the photographing light information on a recording portion provided on the film.

17. A camera according to claim 16, wherein said recording means magnetically records the photographing light information on a magnetic recording portion provided on the film.

18. A camera according to claim 12, wherein said colorimetry sensor portion has a plurality of sensors having different light receiving angles, and said designating means selects said sensors to thereby designate a light receiving angle.

19. A camera according to claim 12, wherein said colorimetry sensor portion has a displacing member for displacing a colorimetry sensor into a different state, and has a different light receiving angle by the sensor being displaced by said displacing member, and said designating means designates a light receiving angle by the sensor being displaced into a predetermined state by said displacing member.

20. A camera according to claim 12, wherein said colorimetry sensor portion has transmission means for selectively directing lights from the different light receiving angles to a colorimetry sensor, and said designating means designates the light from a light receiving angle of the lights directed by said transmission means to thereby designate the light receiving angle.

* * * * *

UNITED STATES PATENT AND TRADEMARK OFFICE
CERTIFICATE OF CORRECTION

PATENT NO. : 5,260,739

DATED : November 9, 1993

INVENTOR(S) : Toru Nagata

It is certified that error appears in the above-indentified patent and that said Letters Patent is hereby corrected as shown below:

On the Title Page:
[56] References Cited

Under "5,087,936   2/1992   Ogato et al. .......354/430"

Insert: --FORIEGN PATENT DOCUMENTS 58-053327  11/1983  Japan--.

COLUMN 1:

line 20, "source" should read --source is--.
    line 41, "provide," should read --provide--.
    line 54, "on," should read --on--.
    line 56, "to a" should read --to provide a--.

COLUMN 2:

line 30, "numeral, 4" should read --numeral 4--.
    line 59, "$S_2$, $S_3$," should read --$S_2$, and $S_3$--.
    line 66, "$S_3$ the" should read --$S_3$, the--.

UNITED STATES PATENT AND TRADEMARK OFFICE
CERTIFICATE OF CORRECTION

PATENT NO. : 5,260,739
DATED : November 9, 1993
INVENTOR(S) : Toru Nagata

It is certified that error appears in the above-indentified patent and that said Letters Patent is hereby corrected as shown below:

COLUMN 4:

line 25, "green(g), and blue(b)" should read --green(G), and blue (B)--.
line 28, " "($\iota nV_R - \iota nV_B$)" " should read --"($\ell nV_R - \ell nV_B$)"--.
line 57, " "why when" " should read --why, when--.
line 60, "why" should read --why,--.

COLUMN 6:

line 5, "(dash)" should read -- - --.
line 11, "(dash)" should read -- - --.
line 16, "(dash)" should read -- - --.
line 20, "(dash)" should read -- - --.
line 24, "(dash)" should read -- - --.

COLUMN 8:

line 31, "if" should read --is--.

Signed and Sealed this

Twenty-first Day of June, 1994

Attest:

BRUCE LEHMAN

*Attesting Officer*    *Commissioner of Patents and Trademarks*